Oct. 14, 1924.
S. I. CORY
1,511,755
ELECTRICAL TESTING SYSTEM
Filed July 16, 1921
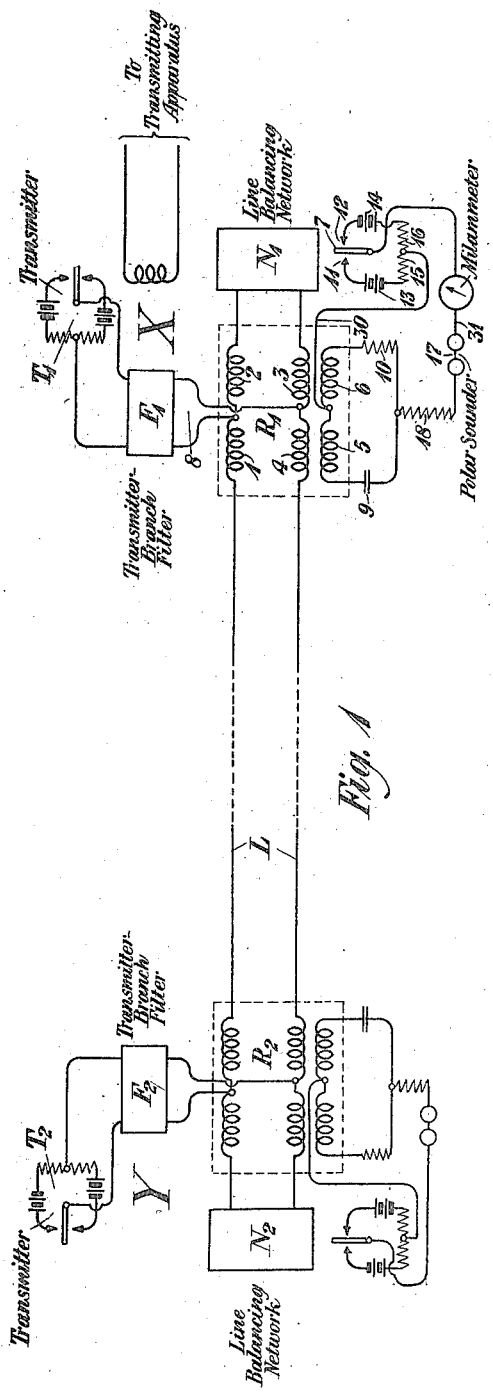
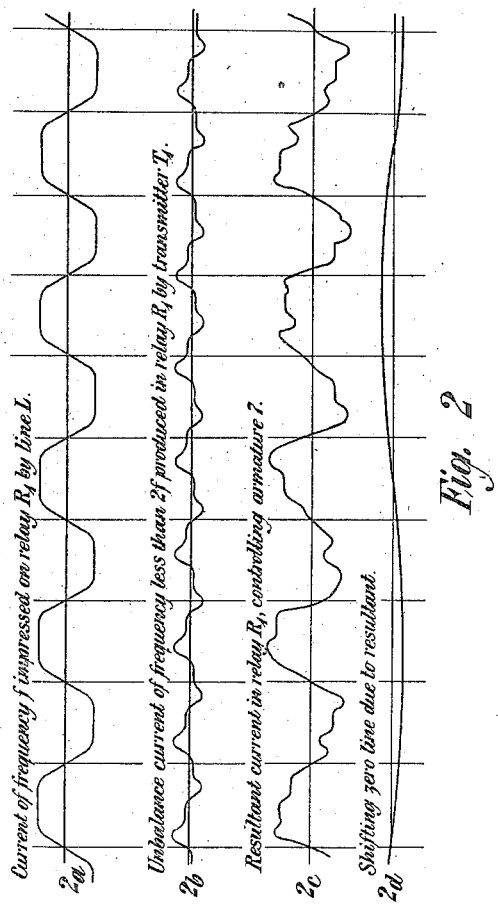
INVENTOR
S. I. Cory
BY
ATTORNEY Patented Oct. 14, 1924.

1,511,755

UNITED STATES PATENT OFFICE.

SAMUEL I. CORY, OF ELMHURST, NEW YORK, ASSIGNOR TO AMERICAN TELEPHONE AND TELEGRAPH COMPANY, A CORPORATION OF NEW YORK.

ELECTRICAL TESTING SYSTEM.

Application filed July 16, 1921. Serial No. 485,206.

*To all whom it may concern:*

Be it known that I, SAMUEL I. CORY, residing at Elmhurst, in the county of Queens and State of New York, have invented certain Improvements in Electrical Testing Systems, of which the following is a specification.

This invention relates to electrical testing systems and particularly to an arrangement for determining the degree of unbalance between two networks, such as a signaling circuit and the network designed to balance the said circuit.

In order to operate most efficiently certain types of signaling circuits, as, for example telephone repeater circuits and duplex telegraph circuits, it is necessary to maintain a high degree of balance between the line circuit and the network which is intended to balance the said circuit.

To attain this result, it is necessary to determine the degree of unbalance between a line circuit and its balancing network. An arrangement for determining the unbalance between a line and its network in a telephone repeater circuit is shown in the application of Clark and Crisson, Serial No. 395,365, filed July 10, 1920. This provides for the determination of the degree of unbalance by applying sinusoidal waves of different frequencies, preferably throughout the voice range, and determining the unbalance at each frequency. Such a method of measuring is desirable in telephony because we are there concerned with the steady-state condition, but in telegraphy the transient phenomena are of greater concern.

A telegraph signaling impulse is a steep sloped wave comprising a plurality of different frequencies which are simultaneously impressed upon the line circuit whenever the key of the transmitting device is closed. It will accordingly be seen that in telegraphy the transient phenomena are of prime importance, and consequently, a measurement made by a sinusoidal wave of a definite frequency does not give correct results.

It is well known to those familiar with the art of duplex telegraphy that if unbalance exists between a line circuit and a network which is designed to simulate electrically the said circuit, the application of signaling impulses to the line circuit by the transmitter connected with the terminal circuit at one end of the said line circuit will cause the receiving relay connected with the same terminal circuit to respond to the transmitted signals, the degree of response depending upon the amount of unbalance existing between the line circuit and its balancing network. This reaction of the transmitted signals upon the receiving relay, due to unbalance between the line and its network, causes distortion of the telegraph signals received from the distant transmitting circuit, the distortion manifesting itself in lengthening or shortening the received signal impulses.

In the copending application of Nyquist, Serial No. 485,308, filed July 16, 1921, there was disclosed means for measuring duplex unbalance which embodied the use of a distortion-bridge circuit connected with the receiving circuit in which the unbalance was to be measured. In the applicant's system, the magnitude of the unbalance is determined by means of a milliammeter connected with the receiving circuit, which responds either to the resultant current of two waves impressed upon the receiving circuit in the manner disclosed in the Nyquist application, or as the result of the application of signaling impulses by the transmitter circuit connected with the terminal circuit where the unbalance is being measured, which method will be made clear in the following description of the invention.

Although this invention will be described in connection with a metallic duplex telegraph circuit it is to be understood that it is not limited to this particular type of circuit but is capable of measuring unbalances existing between any two types of networks.

This invention will be better understood from the following description when read in connection with the attached drawing of which Figure 1 shows one form of embodiment of the invention and Fig. 2 shows current curves $2^a$, $2^b$, $2^c$ and $2^d$, which serve to make clear the principle involved in this invention.

In Fig. 1, a line circuit L extends between two stations X and Y. Connected with the line L at the station X is a balancing network $N_1$ the function of which is to balance the said line with respect to the transmission of signaling impulses by the transmitter $T_1$. Connected between the line L and its network $N_1$ is a receiving relay $R_1$ having a plurality of windings designated 1, 2, 3, 4, 5 and 6. Windings 1, 2, 3 and 4 are of the same magnitude and are connected serially in the line. Windings 5 and 6 are connected in series with what is commonly known as the vibratory circuit. All of these windings are arranged upon the same core, the magneto motive force of which is adapted to control the action of the armature 7.

Bridged across the junction point of windings 1 and 2, and the junction point of windings 3 and 4 is the transmitting circuit 8, by means of which signaling impulses from the transmitter $T_1$ are effectively applied to the line L for transmission to the receiving circuit at the distant station Y. This transmitting circuit comprises in addition to the transmitter $T_1$ a transmitter-branch filter $F_1$ which is adapted to modify the impulses generated by the transmitter $T_1$ so that they will have a wave shape which is best adapted to produce an arrival wave of the most desirable form at station Y, and at the same time to prevent interference with the telephone signaling currents which might be transmitted simultaneously over the circuit L.

It will be clearly seen that the current impressed by the transmitting circuit 8 will flow in opposite directions in windings 1 and 2, and also oppositely in windings 3 and 4, and if the network $N_1$ exactly balances the line L, the current will likewise be of the same magnitude in the respective windings so that no resultant flux will be set up in the core and consequently no effect will be produced upon the armature 7. If, however, there exists an unbalance between the network $N_1$ and its line $L_1$ the magnitude of the currents in the network and the line will be different, thereby affecting the armature 7. The object of this invention is to determine the degree of unbalance that exists between the network and its line and to eliminate or reduce the unbalance by proper adjustment.

The vibratory circuit, in which the windings 5 and 6 are located, also contains a condenser 9 and a resistance 10, the function of which will later be made clear in the description of the operation of the circuit. The armature 7, which is connected with the receiving circuit is adapted to move between the contacts 11 and 12 with which are connected batteries 13 and 14 of opposite polarity. Connected between the batteries 13 and 14 are the resistances 15 and 16, the junction point of which is connected with the junction point of the windings 5 and 6. The armature 7 is connected with a milliammeter which is in series with a polar sounder and a resistance which is connected with the vibratory circuit between the condenser 9 and the resistance 10.

The terminal circuit at station Y is in general similar to the circuit at station X described above, excepting that the milliammeter has been omitted and needs no further explanation.

Having in mind the foregoing description of the apparatus shown in the drawing, the invention will be clearly understood from the following description of the mode of operation of the circuit in which it is embodied.

This invention is based upon the principle of "beating" together two waves, each comprising a series of reversals of two different frequencies and detecting the variations in the operation of the armature of the receiving relay resulting from the effect of unbalance between the line circuit and its balancing net work. Let it be assumed that reversals of a frequency $f$ are being transmitted by the transmitter $T_2$ over the line L so as to operate the armature 7 of the receiving relay $R_1$. When the current from the transmitter $T_2$ flows through the windings 1—2 and 3—4 in a definite direction, it will move the armature 7 to one of its contacts, as for example, 12. Current will then flow from battery 14 through resistance 16 to the junction point of windings 5—6 and through the resistances 10 and 18 and the polar sounder 17 and contact 12 to the opposite side of the battery. This will charge the condenser 9, located in the vibratory circuit. Furthermore, the flow of current through the winding 6 will be in such direction as to create a magneto-motive force which will have such effect upon the armature 7 as to tend to pull it away from the contact 12, although it will not effect the actual opening of this contact so long as the line current from the transmitter $T_2$ tends to flow in the previously assumed direction through the line windings of the relay $R_1$. When the line current through the windings 1—2 and 3—4, falls below a certain minimum value the armature 7 will move from contact 12 and condenser 9 will discharge through a circuit comprising the windings 5 and 6 in series with the resistance 10, and the resultant discharge of current through these windings will be in such direction as to move the armature 7 quickly from contact 12. Since it has been assumed that the wave being transmitted by the transmitter $T_2$ constitutes a series of reversals of frequency $f$, such as shown in curve $2^a$, the reversal of the current on the line L and in the windings 1—2 and 3—4 will move the armature to contact 11 and will cause current of positive polarity to flow through the vibratory circuit, charging the condenser 9 in an opposite sense. The flow of current through the winding 6 will be in a direction as will tend to cause the armature 7 to move away from contact 11 and this will be effected by the action of the discharge of condenser 9 through the windings 5 and 6, as soon as the current in the line windings falls below a definite minimum amount. The purpose of this vibratory circuit is to overcome the sluggish action of the armature 7 when the current in the line circuit reverses, as in the sending of marking and spacing signals, and provides therefor a means for obtaining quick positive action of the receiving relay $R_1$. The receipt of a series of reversals of frequency $f$ as represented by curve $2^a$, will cause uniform operation of the armature 7.

While the transmitter $T_2$ is being operated to send over the line L reversals of frequency $f$ let the transmitter $T_1$ be simultaneously operated for the purpose of transmitting from station X to station Y, a series of reversals of frequency $f'$. The frequency $f'$ may be either slightly greater or less than twice the frequency of the signals sent out by the transmitter $T_1$, and will, for illustration, be assumed to be less than $2^f$. The current from the transmitter $T_1$ will be impressed by the transmitting circuit 8 across the line L at the junction points between the windings 1—2 and the windings 3—4, and will divide, part of it flowing through the winding 1 over the line L and back through the winding 4, and the other part flowing through the winding 2 through the line balancing network $N_1$ and the winding 3. Since these windings are upon the same core, and since the flow of current is in opposite directions from their respective junction points there will be no resulting magnetization of the core if the currents are equal, which shows that the line balancing network exactly balances electrically the line L. If, however, there exists an unbalance between the line balancing network and the line circuit then the currents flowing in the windings 1—2 and 3—4 from their respective junction points, will be unequal and the resultant magnetization if large enough will cause a movement of the armature 7. The wave shown in curve $2^b$ is the unbalance current that tends to magnetize the core of the relay $R_1$ and therefore to operate the armature 7. It is the difference in the current that flows from the midpoint of the windings of $R_1$ through the line and through the line balancing network $N_1$. This resultant current, due to the inequality of balance, either adds to or subtracts from the incoming wave of frequency $f$ and produces a resultant magnetizing current as shown in curve $2^c$. It will be seen that the wave shown in curve $2^c$ does not cross the zero axis at definite intervals of time, but that some of the reversals have been shortened and others have been lengthened. This distortion of the magnetizing current which is produced by the unbalance between the line circuit, and the balancing network likewise produces irregularity of operation of the armature 7. The armature will not remain upon its contacts for equal periods of time since the time that it will remain upon any one contact will depend upon the duration of the magnetizing current.

If there were no unbalance between the network $N_1$ and the line there would be no unbalance currents flowing in the windings of the relay $R_1$ and consequently there would be no distortion of the wave of the received current represented by curve $2^a$. Consequently, the armature 7 would be moved between its contacts at a uniform rate which would cause the needle of the milliammeter to swing an equal distance from each side of the zero point whenever reversals took place. The unbalance current which results from imperfect balance between the network and the line distorts the curve of the received current, the resultant current curve being as shown in curve $2^c$, and inspection of this curve makes it apparent that the dot length measured on the zero axis is alternately lengthened and shortened throughout the period of application of the transmitted current. This lengthening and shortening may be assumed to be due to the introduction of a current of the frequency shown in the curve $2^d$ for the particular differences in speed represented by the curves $2^a$ and $2^b$. The armature 7 of the relay, which vibrates at frequency $f$, will be biased alternately to the marking and the spacing contacts according to the rate of change between the received reversals of the frequency $f$ and the interfering current resulting from the transmittal at the rate something less than $2^f$. Accordingly, the center of vibration of the milliammeter needle will follow the shifting of the bias, the shift indicating the degree of unbalance. The artificial line $N_1$ should be adjusted until the magnitude of the periodic shift is as small as it is possible to make it, which indicates the condition of best balance.

In practice the reversals transmitted by the circuit 8, connected with the terminal circuit at station X, should not be much different in speed than twice those transmitted at the distant end, that is at station Y, so that there will be a slow shifting of the center of vibration of the ammeter needle. Tests have shown that a speed of the reversals transmitted at the distant end should be of the order of from 3 to 6 per second, and that the phase change between the transmitters at station Y and station X should not be faster than about one cycle per minute for the best results.

In Fig. 1 the ammeter has been shown connected in series with the armature of the relay, but the ammeter might be connected in series with any other local circuit operated from the relay, and the unbalance and distortion might be measured in a manner equally as good as that described.

Another method for measuring the magnitude of the unbalance which does not involve the transmission of reversals from the distant station Y is as follows: The battery is removed from the transmitting circuit at the station Y and the transmitting branch is closed through an impedance simulating the transmitter $T_2$. The armature of the receiving relay at station X will then vibrate freely at a period determined by the constants of the vibratory circuit, which includes the condenser 9, resistance 10 and the inductances of the windings 5 and 6, which are connected in series therewith. This vibratory circuit constitutes in effect a source comparable with the transmitting branch of the station Y. If, during the period of free vibration, signals are transmitted from the circuit 8 of station X at a rate which is slightly different from twice the rate of vibration of the armature as controlled by the vibratory circuit, the wave of the resultant current will be similar to that shown in curve $2^c$, which will produce a shifting zero line as shown in curve $2^d$. The method of obtaining the balance is the same as described heretofore in connection with the transmission of reversals of frequency $f$ from the station Y. This method provides a speedy method for obtaining the magnitude of the unbalance between the network and its line circuit, which method, however, is not as satisfactory as the one first described in that the speed of transmission of reversals from the circuit 8 will have to be adjusted frequently because the vibrating speed of the armature 7 will vary somewhat between different terminal circuits due to the differences in their relays, their adjustments and other causes. The results obtainable should be substantially the same in accuracy in both methods.

Although this invention has been disclosed as embodied in a definite form and arrangement of parts, it is to be understood that it is capable of embodiment in other and different forms and arrangements without departing from the spirit and scope of the invention as defined in the appended claims.

What is claimed is:

1. The method for determining the degree of unbalance between two networks which consists in impressing across said networks signaling currents of different frequencies, said frequencies being derived from different sources allowing the resultant current to control an electromagnetic device having an indicating device in series with its armature whereby the degree of unbalance between the said networks may be determined by the variation in the cyclic movement of said armature.

2. The method for determining the degree of unbalance between two networks which consists in impressing a signaling impulse across said networks, allowing the current resulting from unbalance between said networks to influence the action of an electromagnetic device the armature of which is normally vibrating at a rate governed by the constants of a circuit with which it is connected and noting by an indicating device connected in series with said armature the variation in the cyclic movement of the said armature resulting from the effect of the unbalance currents.

3. The method for determining the degree of unbalance between a line circuit and its balancing circuit which consists in impressing telegraph signaling impulses across said circuits in parallel, allowing the resultant current to bias the action of an armature vibrating periodically between its contacts determining the degree of unbalance between the line circuit and the balancing circuit by the variation in the cyclic movement of said armature as shown by current indicating means connected between said armature and its contacts.

4. In a duplex telegraph signaling system, the combination with a line circuit, of an artificial line to be adjusted to balance the said line circuit, a relay having certain windings connecting the said line circuit with the said artificial line, a transmitting circuit bridged across the midpoints of the line windings of the said relay, a receiving circuit comprising a vibratory circuit, an armature controlled by the said relay having sources of current of opposite polarity associated therewith, the said armature being connected with the said vibratory circuit in such manner as to apply thereto impulses of opposite polarity, and an indicating instrument connected between the said armature and the said vibratory circuit to indicate the distortion of received signals by the transmitted signals through the medium of the armature of said relay.

5. In a duplex telegraph signaling system, the combination with a line circuit having a source of telegraph signals associated therewith, of an artificial line to balance the said line circuit, a relay having windings connecting the said line circuit and the said artificial line, an armature having sources of current of opposite polarity associated therewith, a transmitting circuit bridged across the said windings adapted to apply current reversals to the said line circuit and the said artificial line in parallel, and a receiving circuit comprising a vibratory circuit having another winding of the said relay in series with a condenser and a resistance, the said vibratory circuit being connected through a current measuring device with the said armature and its associated sources of current in such manner as to indicate the degree of variation of the cyclic movement of the said armature resulting from unbalance between the artificial line and its line circuit.

6. In a duplex telegraph signaling system comprising a line circuit, a plurality of terminal circuits each having a transmitting circuit, a receiving circuit, a balancing network, and a multi-winding relay connecting the said circuits and the said networks, the method of measuring the magnitude of the unbalance between a line circuit and its balancing network at one of the said terminal circuits, which consists in impressing upon the line circuit at the other of said terminal circuits current reversals of a definite frequency, simultaneously impressing across the midpoints of the line windings of the said relay by means of the said transmitting circuit current reversals of about twice the frequency of the reversals transmitted from the said terminal circuit, allowing the resultant current to operate the armature of the said relay whereby impulses of opposite polarity may be impressed upon the said receiving circuit, the period of operation of the said armature being controlled by the periodic change of the said resultant current and allowing the said impulses to actuate a current measuring device connecting said receiving circuit whereby the magnitude of the unbalance between the said artificial line and the line circuit may be determined.

In testimony whereof, I have signed my name to this specification this 15th day of July, 1921.

SAMUEL I. CORY.